(12) United States Patent
Tang et al.

(10) Patent No.: US 11,239,525 B2
(45) Date of Patent: Feb. 1, 2022

(54) BATTERY PACK

(71) Applicant: Contemporary Amperex Technology Co., Limited, Ningde (CN)

(72) Inventors: Yu Tang, Ningde (CN); Yanbo Chen, Ningde (CN); Peng Wang, Ningde (CN); Kaijie You, Ningde (CN); Xingdi Chen, Ningde (CN)

(73) Assignee: Contemporary Amperex Technology Co., Limited, Ningde (CN)

( * ) Notice: Subject to any disclaimer, the term of this patent is extended or adjusted under 35 U.S.C. 154(b) by 86 days.

(21) Appl. No.: 16/838,066

(22) Filed: Apr. 2, 2020

(65) Prior Publication Data

US 2021/0036278 A1 Feb. 4, 2021

(30) Foreign Application Priority Data

Aug. 2, 2019 (CN) .......................... 201910710351.4

(51) Int. Cl.
*H01M 50/20* (2021.01)

(52) U.S. Cl.
CPC ........ *H01M 50/20* (2021.01); *H01M 2220/20* (2013.01)

(58) Field of Classification Search
None
See application file for complete search history.

(56) References Cited

U.S. PATENT DOCUMENTS

| 2016/0218388 A1 | 7/2016 | Kim et al. |
| 2019/0393458 A1 | 12/2019 | Zeng et al. |
| 2020/0028201 A1 | 1/2020 | Ahn |
| 2020/0152928 A1 | 5/2020 | Cai et al. |
| 2020/0212525 A1 | 7/2020 | Ogino et al. |

(Continued)

FOREIGN PATENT DOCUMENTS

| CN | 202268412 U | 6/2012 |
| CN | 202434596 U | 9/2012 |
| CN | 105826492 A | 8/2016 |

(Continued)

OTHER PUBLICATIONS

Extended European Search Report issued in European Application No. 20166062.8, dated Dec. 22, 2020, 5 pages.

(Continued)

*Primary Examiner* — Wyatt P McConnell
(74) *Attorney, Agent, or Firm* — Sterne, Kessler, Goldstein & Fox P.L.L.C.

(57) ABSTRACT

A battery pack includes a box body assembly including a box body and a plurality of fixing beams which are fixed in the box body and divide the internal space into a plurality of containing cavities, a plurality of battery modules correspondingly arranged in each containing cavity and a plurality of restraint components, each of which includes a limit part, a first mounting part and a second mounting part. Each limit part covers each battery module correspondingly. The first and second mounting part are connected on both sides of the limit part in the direction in which the plurality of fixing beams are arranged and fixed with the fixing beams on both sides of the corresponding battery module respectively; the first mounting part of one of adjacent restraint components and the second mounting part of the other are fixed on the same fixing beam and overlapped in a height direction.

13 Claims, 6 Drawing Sheets

(56) References Cited

U.S. PATENT DOCUMENTS

2021/0036278 A1  2/2021  Tang et al.
2021/0066677 A1  3/2021  Tang et al.

FOREIGN PATENT DOCUMENTS

| CN | 106601958 A    | 4/2017  |
| CN | 206148486 U    | 5/2017  |
| CN | 107658401 A    | 2/2018  |
| CN | 207558892 U    | 6/2018  |
| CN | 208336326 U    | 1/2019  |
| CN | 209000986 U    | 6/2019  |
| CN | 209104243 U    | 7/2019  |
| CN | 209963117 U    | 1/2020  |
| CN | 209963118 U    | 1/2020  |
| CN | 111106279 A    | 5/2020  |
| CN | 111106282 A    | 5/2020  |
| EP | 3506386 A1     | 7/2019  |
| JP | 201681857 A    | 5/2016  |
| WO | 2018190498 A1  | 10/2018 |
| WO | 2019026676 A1  | 2/2019  |

OTHER PUBLICATIONS

International Search Report issued in International Application No. PCT/CN2020/097402, dated Sep. 16, 2020, 8 pages.

BATTERY PACK

CROSS-REFERENCE TO RELATED APPLICATION

This application claims priority to Chinese Patent Application No. 201910710351.4 filed Aug. 2, 2019, the disclosures of which are hereby incorporated in their entirety by reference.

FIELD OF THE DISCLOSURE

The present disclosure relates to the field of battery technology, particularly to a battery pack.

BACKGROUND OF THE DISCLOSURE

In recent years, rechargeable batteries have been widely used to power vehicles. Multiple rechargeable batteries are connected in series, parallel or hybrid to achieve larger capacity or power.

However, it is found in actual use that battery pack outer covers are large in size and poor in stiffness, and battery cells will expand during charging and discharging, which makes the battery pack outer covers deform greatly; and then after the battery pack outer covers deform, the leak tightness of the outer covers and box bodies will deteriorate, which will lead to short circuit problem caused by the water vapor entering the battery packs.

SUMMARY OF THE DISCLOSURE

The embodiments of the disclosure provide a battery pack, the leak tightness of which is improved.

The disclosure provides a battery pack which comprises:
a box body assembly, including a box body and a plurality of fixing beams which are fixed to the box body and divide the box body into several containing cavities;
a plurality of battery modules, each of which comprises a plurality of battery cells and is correspondingly arranged in each containing cavity; and
a plurality of restraint components, each of which comprises a limit part, a first mounting part and a second mounting part; wherein each limit part covers each battery module correspondingly, the first mounting part and the second mounting part are respectively connected on both sides of the limit part in the direction in which a plurality of fixing beams are arranged, and are fixed with the fixing beams on both sides of the corresponding battery module respectively;
wherein, for two adjacent restraint components, the first mounting part of one restraint component and the second mounting part of the other restraint component are fixed on the same fixing beam and overlapped in a height direction.

In some embodiments, the limit part protrudes from the first mounting part and the second mounting part in a direction away from the battery modules;
there is a first distance L1 between the bottom surface of the first mounting part and the top surface of the limit part, and a second distance L2 between the bottom surface of the second mounting part and the top surface of the limit part; and
wherein the first distance L1 is greater than the second distance L2.

In some embodiments, a first restraint component, a second restraint component and a third restraint component constitute three adjacent restraint components and are arranged in sequence along the direction in which the plurality of fixing beams are arranged;
wherein the first mounting part of the first restraint component is below the second mounting part of the second restraint component, and the first mounting part of the second restraint component is below the second mounting part of the third restraint component.

In some embodiments, the limit part protrudes from the first mounting part and the second mounting part in a direction away from the battery modules, and the two adjacent restraint components are a fourth restraint component and a fifth restraint component;
in the fourth restraint component, there is a first distance L1 between the bottom surface of the first mounting part and the top surface of the limit part, and between the bottom surface of the second mounting part and the top surface of the limit part;
in the fifth restraint component, there is a second distance L2 between the bottom surface of the first mounting part and the top surface of the limit part, and between the bottom surface of the second mounting part and the top surface of the limit part; and
wherein the fourth restraint component and the fifth restraint component are arranged alternately along the direction in which the plurality of fixing beams are arranged, and the first distance L1 is greater than the second distance L2.

In some embodiments, the thickness of the first mounting part is t, and L1−L2≥t.

In some embodiments, the battery pack further comprises a plurality of fasteners;
wherein the first mounting part is provided with a plurality of first mounting holes spaced along the length direction of the fixing beams, and the second mounting part that is superposed on the first mounting part in the height direction is provided with a plurality of second mounting holes along the length direction of the fixing beams; and
each fastener passes through the corresponding second mounting hole and the corresponding first mounting hole in turn and is fixed with the corresponding fixing beam.

In some embodiments, the first mounting part is located below the second mounting part which is overlapped on the first mounting part in the height direction, and the diameter of the second mounting holes is smaller than the diameter of the first mounting holes.

In some embodiments, a stiffener is provided on the limit part.

In some embodiments, the restraint components have a split structure and cover at least part of the surfaces of the corresponding battery modules.

In some embodiments, the battery pack further comprises an outer cover which is disposed on one side of the restraint components away from the battery modules and closes an open end of the box body.

In some embodiments, there is a preset gap between an inner surface of an outer cover and the outer surface of the restraint components, preferably in a range of 2 mm to 100 mm.

In some embodiments, the battery pack comprises at least one of the following:
a first adhesive layer arranged between a bottom surface of each battery module and an inner bottom surface of the box body;
a second adhesive layer arranged between two adjacent battery cells in the battery module; or,
a third adhesive layer arranged between a top of each battery module and the restraint components.

Based on the above technical solutions, for the battery pack according to an embodiment of the disclosure, by providing restraint components and fixing the restraint components with fixing beams, a stable and effective pressure is provided for each battery module and the degree of expansion and deformation of the battery modules are reduced when the battery modules are expanding. Moreover, by fixing two adjacent restraint components on the same fixing beam, the number of fixing beams can be reduced, the structure of the box body assembly can be simplified, and the width occupied by the fixing beams in the horizontal plane can be reduced. In addition, the overlapping of the first mounting part and the second mounting part fixed on the same fixing beam in the height direction can further reduce the width occupied by the fixing beams in the horizontal plane, improve the energy density and space utilization of the battery pack and enhance the assembly efficiency of the restraint components and the fixing beams.

BRIEF DESCRIPTION OF THE DRAWINGS

The accompanying drawings, which constitute part of this application, are intended to provide a further understanding of the disclosure. The exemplary embodiments of the disclosure and description thereof serve to explain the disclosure, but do not constitute improper restrictions on the disclosure. In the drawings.

DETAILED DESCRIPTION OF THE DISCLOSURE

The disclosure is described in detail below. Different aspects of embodiments are defined in more detail in the following paragraphs. Each aspect so defined may be combined with any other aspect or aspects unless clearly indicated to the contrary. In particular, any feature indicated as being preferred or advantageous may be combined with any other feature or features indicated as being preferred or advantageous.

The terms "first", "second" and the like used in the disclosure are merely for convenience of description to distinguish different components having the same name, and do not indicate sequential or primary or secondary relationships.

In addition, when an element is said to be "on" another element, the element may be directly on the other element, or indirectly on the other element with one or more intermediate elements inserted between the two. Further, when an element is said to be "connected to" another element, the element may be directly connected to the other element, or indirectly connected to the other element with one or more intermediate elements inserted between the two. In the following paragraphs, the same reference number represents the same element.

In the disclosure, "a plurality of" means more than two (including two), similarly, "a plurality of groups" means more than two groups (including two groups), and "a plurality of pieces" means more than two pieces (including two pieces).

Figure 1:
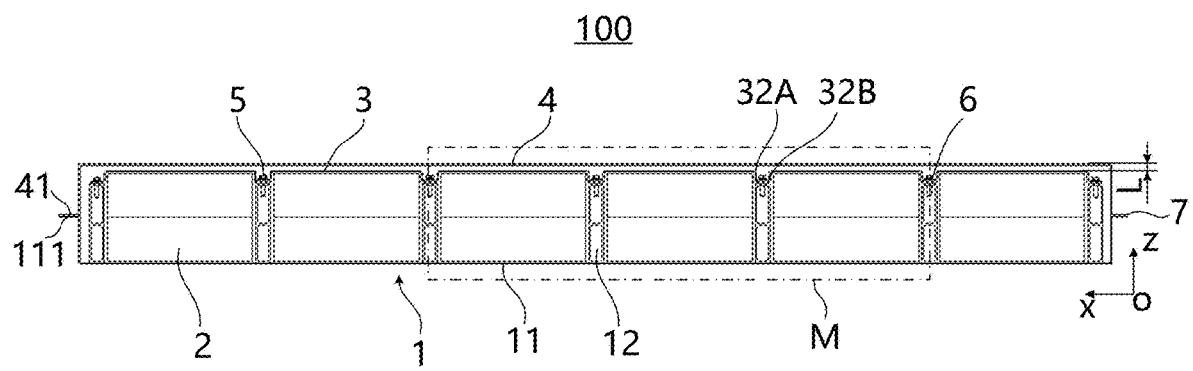
FIG. 1 is a sectional view along the xz plane of an embodiment of the battery pack of the disclosure.

For clearly describing the various directions in the following embodiments, taking the definition of each direction of the battery pack in the coordinate system as shown in FIG. 1 as an example, x direction represents the length direction of the battery pack (hereinafter referred to as the length direction); y direction represents the width direction of the battery pack (hereinafter referred to as the width direction); Z direction is perpendicular to the plane formed by the x and y directions and indicates the height direction of the battery pack (hereinafter referred to as the height direction). When the battery pack is installed on a vehicle, the height direction of the battery pack is parallel to the vertical direction, and the vertical direction mentioned here allows for a certain angle deviation from the theoretical vertical direction. Based on this direction definition, "upper", "lower", "top", and "bottom" are used, all relative to the height direction.

FIG. 1 to FIG. 12 are schematic diagrams of an embodiment of the battery pack of the disclosure. The battery pack 100 comprises: a box body assembly 1, a plurality of battery modules 20 and a plurality of restraint components 3.

Figure 2:
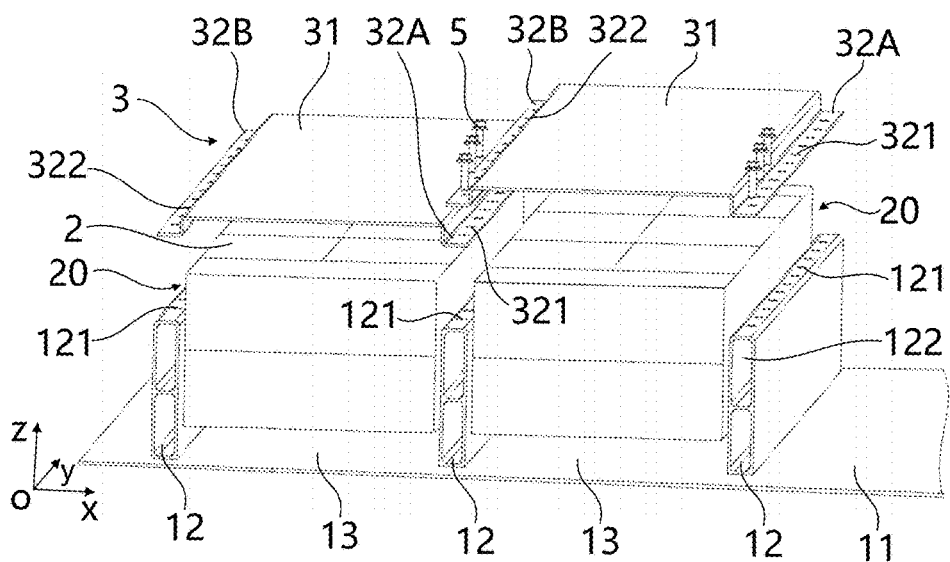
FIG. 2 is an exploded view of the battery pack shown in FIG. 1.

As shown in FIG. 1 and FIG. 2, the box body assembly 1 includes a box body 11 and a plurality of fixing beams 12; the box body 11 has an open end, and each of the fixing beams 12 is fixed to the box body 11 and divides the box body 11 into a plurality of containing cavities 13. For example, the fixing beams 12 may be fixed on the inner bottom surface or on the side wall of the box body 11. As for the concrete structure, the fixing beams 12 may have a solid or hollow structure. For example, a weight reduction groove 122 may be provided inside each fixing beam 12. For each fixing beam 12, the section may be rectangular, trapezoidal or C-shaped, and the upper surface may be arranged as a plane, so as to fix the restraint components on the upper surface of fixing beams 12. Optionally, the restraint components 3 may also be fixed on the side faces of the fixing beams 12.

Each battery module 20 comprises a plurality of battery cells 2. For example, each battery module 20 may have one layer of or a plurality of overlapped layers of battery cells 2 along the height direction. Optionally, at least two or more battery cells 2 can be arranged along the length direction and/or width direction in the battery modules 20. Each battery module 20 is correspondingly arranged in each containing cavity 13, one battery module 20 in each containing cavity 13. In some embodiments, the size of the containing cavity 13 is suitable for the overall size of the corresponding battery module 20.

As shown in FIG. 2, each restraint component 3 includes a limit part 31, a first mounting part 32A and a second mounting part 32B, and each limit part 31 covers each battery module 20 correspondingly and may contact or keep a gap with the top battery cell 2. The first mounting part 32A and the second mounting part 32B are respectively connected to both sides of the limit part 31 in the direction along which the plurality of fixing beams 12 are arranged, and are respectively fixed to the fixing beam 12 on both sides of the corresponding battery module 20. Restraint components 3 cover battery cells 2.

As shown in FIG. 2, for two adjacent restraint components, the first mounting part 32A of one restraint component 3 and the second mounting part 32B of the other restraint component 3 are fixed on the same fixing beam 12 and are overlapped in the height direction.

By providing restraint components 3 and fixing the restraint components with fixing beams 12, the present embodiment of the disclosure provides a stable and effective pressure for each battery module 20 and reduces the degree of expansion and deformation of the battery modules when the battery modules are expanding. Moreover, by fixing two adjacent restraint components 3 on the same fixing beam 12, the number of fixing beams 12 can be reduced; the structure of the box body assembly 1 can be simplified and the width occupied by fixing beams in the horizontal plane can be reduced. In addition, the overlapping of the first mounting part 32A and the second mounting part 32B fixed on the same fixing beam 12 in the height direction can further reduce the width occupied by the fixing beams 12 in the horizontal plane and allows to lock adjacent battery modules 20 by locking the fasteners required for a single battery module 20 only, which improves the energy density and space utilization of the battery pack, and enhances the assembly efficiency of the restraint components and the fixing beams.

Furthermore, the separation of two adjacent battery modules by fixing beams 12 is capable of delaying the diffusion of heat to other battery modules 20 when some of the battery modules 20 generate such a large amount of heat in working that thermal runaway occurs, thereby improving the working safety of the battery pack.

In some embodiments, the extension widths of the first mounting part 32A and the second mounting part 32B from limit part 31 are the same, so that the first mounting part 32A and the second mounting part 32B are roughly overlapping, which can further reduce the width occupied by the fixing beams 12 in the horizontal plane, thereby improving the energy density and space utilization of the battery pack.

Figure 3:
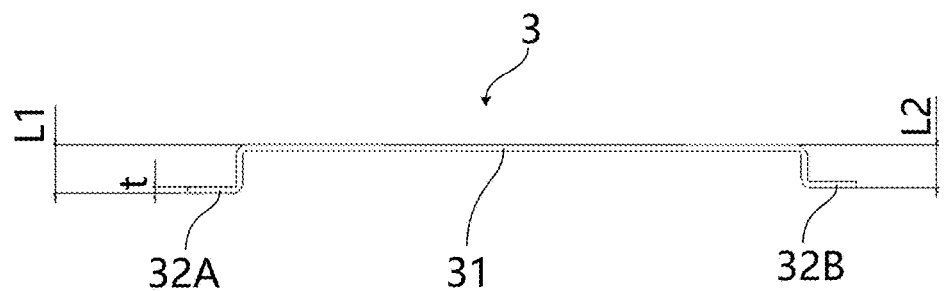
FIG. 3 is a front view of restraint components in the battery pack shown in FIG. 1.
Figure 4:
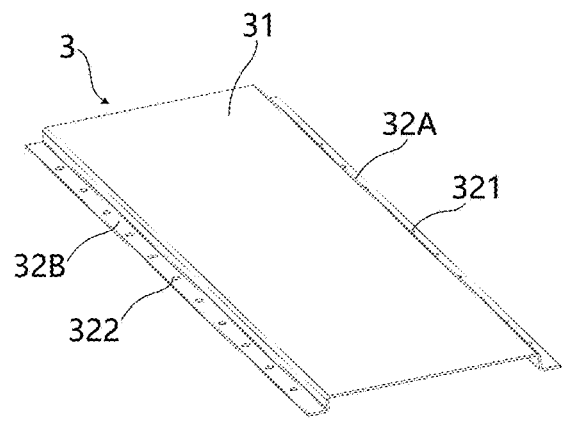
FIG. 4 is a perspective drawing of restraint components in the battery pack as shown in FIG. 1.

In some embodiments, as shown in FIG. 3 and FIG. 4, the limit part 31 of each restraint component 3 protrudes from the first mounting part 32A and the second mounting part 32B in a direction away from the battery modules 20, and there is a first distance L1 between the bottom surface of the first mounting part 32A and the top surface of the limit part 31 and a second distance L2 between the bottom surface of the second mounting part 32B and the top surface of the limit part 31. The first distance L1 is greater than the second distance L2. When two adjacent restraint components 3 are fixed on the same fixing beam 12, the first mounting part 32A is located at the bottom of the second mounting part 32B.

In this embodiment, by providing a height difference between the first mounting part 32A and the second mounting part 32B of each restraint component 3, two adjacent restraint components 3 can be installed on the same fixing beam 12, and the first mounting part 32A of one restraint component 3 and the second mounting part 32B of the other restraint component 3 can be overlapped in the height direction. In addition, all restraint components 3 in the battery pack have the same structure and adopt the same assembly direction, which can reduce the types of parts and reduce the difficulty of assembly.

In some embodiments, as shown in FIG. 3, the thickness of the first mounting part 32A is t and L1−L2≥t.

If L1−L2=t, the first mounting part 32A and the second mounting part 32B of two adjacent restraint components 3 are in direct contact and there is no need to use an adjusting gasket, which simplifies the assembly process.

If L1−L2>t, there is a gap between the first mounting part 32A and the second mounting part 32B of the two adjacent restraint components 3, so an adjusting gasket needs to be provided between the first mounting part 32A and the second mounting part 32B according to the gap size to make the first mounting part 32A and the second mounting part 32B locate reliably and improve the firmness of fixing between each restraint component 3 and respective fixing beam 12.

Figure 5:
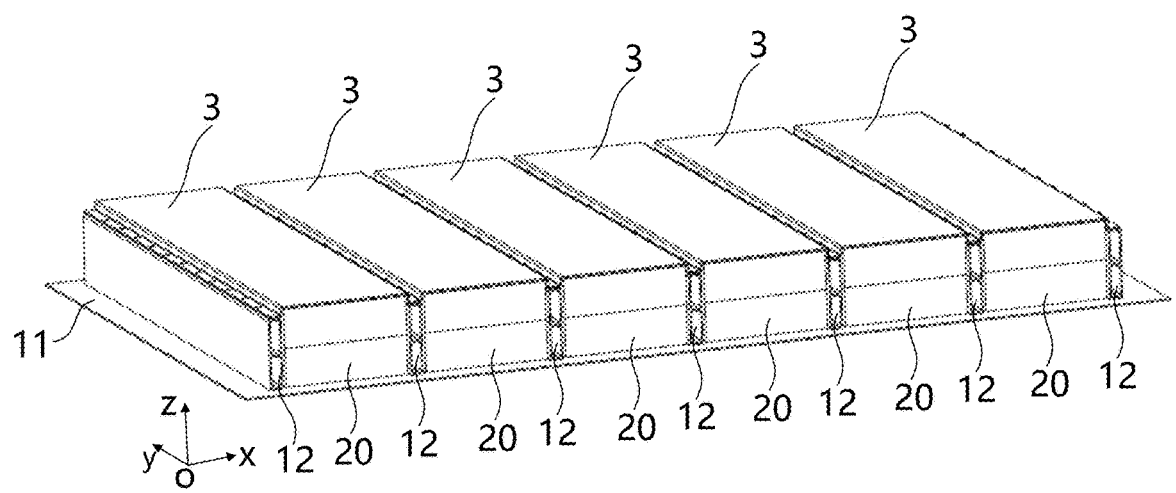
FIG. 5 is an assembly drawing of the battery pack as shown in FIG. 1 after the outer cover is removed.

As shown in FIG. 1 and FIG. 5, there are seven fixing beams 12 spaced along the length (x direction) inside the box body 11, and a containing cavity 13 is formed between every two adjacent fixing beams 12; each containing cavity 13 is provided with one battery module 20 and there are a total of six battery modules 20 in the box body 11. Each battery module 20 has two layers of battery cells 2 along the height direction, and each layer of battery cell 2 comprises a plurality of battery cells 2 arranged along the width direction (y direction). The limit part 31 of each restraint component 3 covers the battery cells 2 of top layer in the corresponding battery module 20. Alternatively, fixing beams 12 can also be arranged along the width direction of the box body 11.

Figure 6:
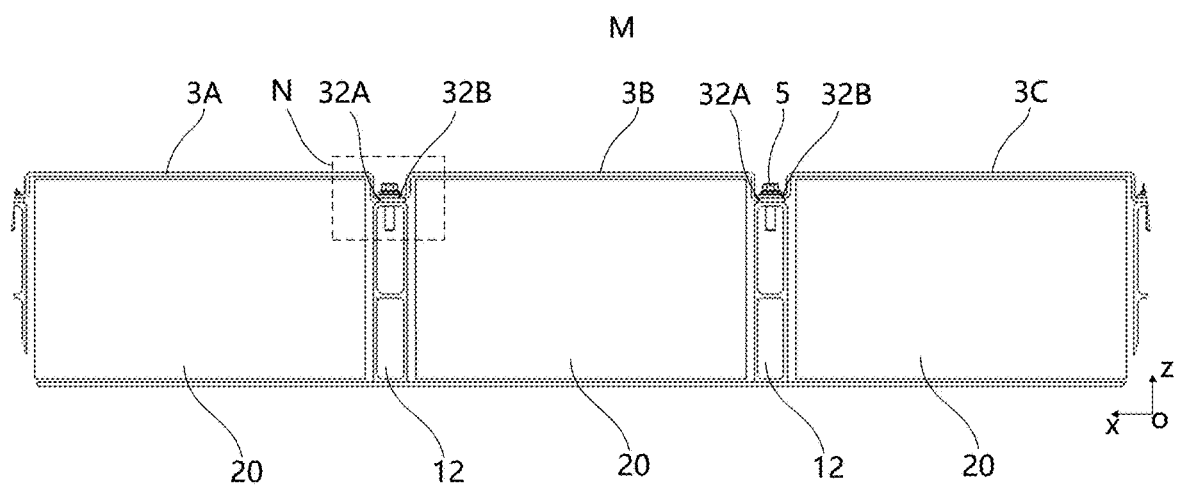
FIG. 6 is a partial enlarged view of position M of the battery pack as shown in FIG. 1.
Figure 7:
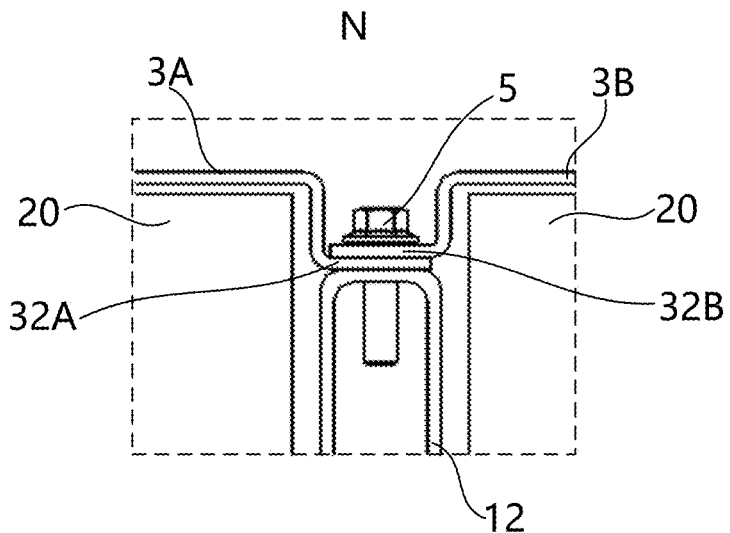
FIG. 7 is a partial enlarged view of position N as shown in FIG. 6.

In order to more clearly reflect the installation relationship of each restraint component 3, as shown in FIG. 6, the installation of three adjacent restraint components 3 is taken as an example, and the installation form of the rest restraint components 3 may be deduced by analogy.

Three adjacent restraint components 3 are a first restraint component 3A, a second restraint component 3B and a third restraint component 3C, all of which are arranged in sequence along the direction in which the plurality of fixing beams 12 are arranged. Where, as shown in FIG. 6, the first mounting part 32A of the first restraint component 3A is below the second mounting part 32B of the second restraint component 3B, and the first mounting part 32A of the second restraint component 3B is below the second mounting part 32B of the third restraint component 3C.

In order to fix the first mounting parts 32A and the second mounting parts 32B with the fixing beams 12, as shown in FIG. 2 and FIG. 4, the battery pack of the disclosure may further include a plurality of fasteners 5. The first mounting parts 32A are provided with a plurality of first mounting holes 321 at intervals along the length direction of the fixing beams 12. The second mounting parts 32B, which are overlapped with the first mounting parts 32A in the height direction, are provided with a plurality of second mounting holes 322 at intervals along the length direction of fixing beams 12. A plurality of third mounting holes 121 are arranged at intervals along the length direction of the fixing beams 12. All fasteners 5 sequentially pass through the second mounting holes 322, the first mounting holes 321 and the third mounting holes 121 at corresponding positions to be fixed with the corresponding fixing beams 12. For example, the fasteners 5 may be screws or bolts, etc., the first mounting holes 321 and the second mounting holes 322 are unthreaded holes, and the third mounting holes 121 are threaded holes.

For some embodiments where the first mounting part 321 is below the second mounting part, the diameter of the second mounting hole 322 on the second mounting part 32B is smaller than the diameter of the first mounting hole 321 on the first mounting part 32A.

The first mounting hole 321 with a larger diameter is arranged on the first mounting part 32A, which makes the restraint components 3 and fixing beams 12 less affected by the machining tolerance during assembly and allows easy installation of fasteners 5. At the same time, the second mounting hole 322 with a smaller diameter is arranged on the second mounting part 32B, which can increase the contact area between the fasteners 5 and the second mounting part 32B, so as to improve the connection strength between the fasteners 5 and the second mounting part 32B, and thus improve the fastness of the fixing between two adjacent restraint components 3 and the fixing beams 12.

In another fixing structure, if the material at the location of the third mounting hole 121 is thin due to the weight reduction grooves 122 on the fixing beams 12, the third mounting hole 121 may be provided as an unthreaded hole, and rivet nuts may be embedded in the third mounting hole 121. Each rivet nut is of a cylindrical structure and has a rim at one end, and the rim is in contact with the top of the fixing beams 12. In order to make the first mounting part 32A reliably contact with the fixing beams 12, the opening diameter of the first mounting hole 321 may be made larger than the outer diameter of the rim of the rivet nuts to avoid the rim, so as to increase the contact area between the first mounting part 32A and the fixing beams 12, thereby ensuring uniform stress and avoiding local stress concentration.

As shown in FIGS. 8 to 11, a stiffener 33 is arranged on the limit part 31 to increase the structural strength of the restraint components 3, therefore a more stable and effective pressure is provided for each battery module 20 and the degree of expansion and deformation of the battery module 20 is reduced.

Figure 8:
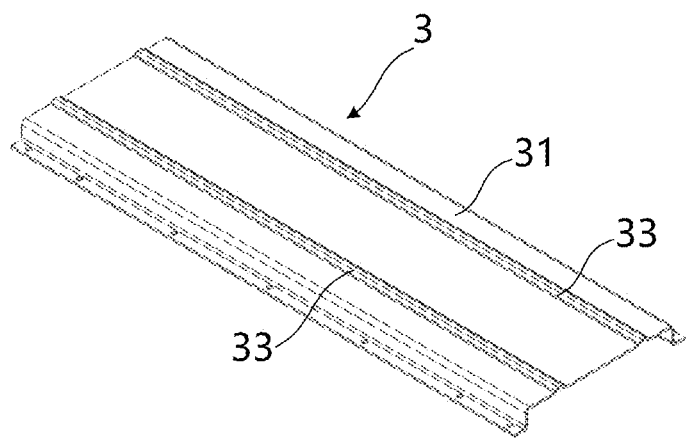
FIG. 8 is a structure diagram of a convex rib which is on a limit part of a restraint component and is toward the direction away from a battery module according to an embodiment of the battery pack in the present disclosure.
Figure 9:
FIG. 9 is a front view of FIG. 8.

As shown in FIGS. 8 and 9, the stiffener 33 includes a plurality of convex ribs arranged at intervals. The convex ribs, which may be made by stamping, are not difficult to manufacture and do not increase the weight of the restraint components 3. Each of the convex ribs protrudes away from the battery modules 20, which allows to maintain a large contact area between the restraint components 3 and the battery modules 20, and to provide a large pressure for the battery module 20.

In some embodiments, the convex ribs extend in the same direction as the extension direction of fixing beams 12, which can form an even pressure for each battery cell 2 on the top layer of the corresponding battery module 20. Optionally, the extending direction of the convex ribs may also be perpendicular to the extension direction of the fixing beams 12, or the convex ribs may be arranged obliquely.

Figure 10:
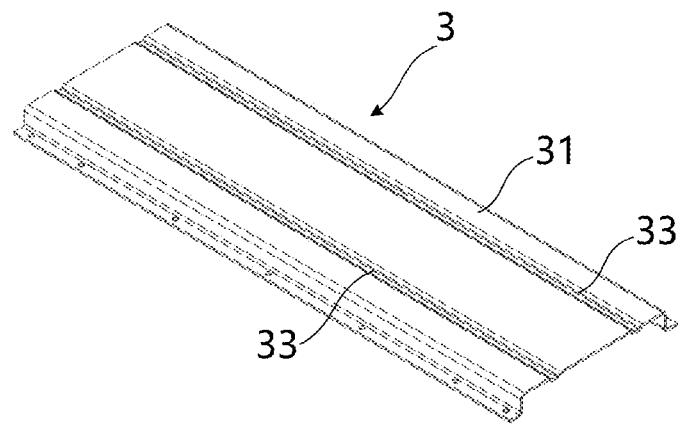
FIG. 10 is a structure diagram of a convex rib which is on a limit part of a restraint component and is toward the direction near a battery module according to an embodiment of the battery pack in the present disclosure.
Figure 11:
FIG. 11 is a front view of FIG. 10.

As shown in FIGS. 10 and 11, unlike FIGS. 8 and 9, each convex rib protrudes toward the direction close to the battery modules 20, which provides a pressure through the stiffener 33 to the battery module 20. In addition, the convex ribs shown in FIGS. 8 and 10 can also be combined.

Alternatively, the stiffener 33 may include a protrusion and/or a recess provided on at least one side surface of the limit part 31, and the protrusion and/or the recess may be formed by machining. For example, when one of the side surfaces of the limit part 31 is provided with a protrusion or recess, the back surface can maintain flat. Further, the stiffener 33 may be a boss or a bump formed by stamping on the limit part 31.

Figure 12:
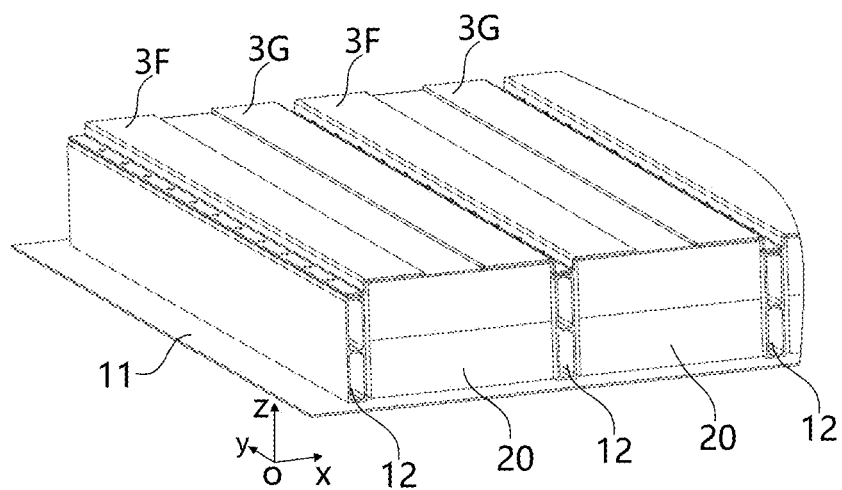
FIG. 12 is a schematic diagram of an embodiment of a split-type restraint component used in the battery pack of the disclosure.

As shown in FIG. 12, each restraint component 3 has a split structure and covers at least part of the surface of the corresponding battery module 20. For example, restraint components 3 can be split along the length and/or width.

FIG. 12 differs from FIG. 5 in that each restraint component 3 covering each single battery module 20 is divided into a first split restraint component 3F and a second split restraint component 3G, where the limit parts 31 of the first split restraint component 3F and the second split restraint component 3G may be spaced apart along the direction in which the plurality of fixing beams 12 are arranged to cover only a part of the surface of the battery modules 20. The first split restraint component 3F and the second split restraint component 3G extend continuously along the width direction.

The advantage of the embodiment is that, affected by the dimensional tolerance of each battery cell 2 in the battery modules 20 and the accuracy of stacking arrangement, the top of each battery cell 2 in the same battery module 20 may also have a height difference, and the use of split-type restraint components 3 makes the processing requirement for the height dimension of the limit part 31 less demanding and allows an easy assembly. Moreover, the split-type restraint components 3 can save materials. In addition, partial coverage of the surface of the battery modules 20 is conducive to the heat dissipation of the battery modules 20.

As shown in FIG. 1, the battery pack of the disclosure may further include an outer cover 4 which is disposed on one side of the restraint components 3 away from the battery modules 20 and closes the open end of the box body 11. The closing here refers to the tight fitting between the outer cover 4 and the box body 11, which can prevent the external liquid and water vapor from entering the battery pack and improve the safety performance of the battery pack.

As shown in FIG. 1, in order to fix the outer cover 4 and the box body 11, there is a first flanging 111 around the open end of the box body 11 and a second flanging 41 around the outer cover 4, and the first flanging 111 and the second flanging 41 can be fixed by means of adhering or fastener connection.

A plurality of restraint components 3 of the battery pack of the above embodiment covers different battery modules 20, and is fixed with the corresponding fixing beam 12, which is equivalent to increasing the fixing points between the restraint components 3 and the box body 11, thereby reducing the span between the fixing points and improving the deformation resistance of the restraint components 3. In the case of battery cell expansion, restraint components 3 are not easy to deform and are capable of further providing stable pressure for the battery modules 20 and preventing the battery pack from increasing in the height direction; moreover, the outer cover 4 is not easy to be extruded due to the deformation of the restraint components 3, thereby improving the service life of the battery pack.

As shown in FIG. 1, there is a preset gap L between the inner surface of the outer cover 4 and the outer surface of the restraint components 3. The preservation of an expansion space for the battery modules 20 makes it possible to prevent the force generated by deformation of the restraint components 3 from being transmitted to the outer cover 4 to force the outer cover 4 to deform. Moreover, even when expansion of the battery modules 20 causes the restraint components 3 to deform so much that the restraint components reach the outer cover 4, the outer cover 4 is capable of also further limiting the deformation of the restraint components 3 and the expansion of the battery modules 20. Preferably, for battery packs of different sizes, the preset gap ranges from 2 mm to 100 mm.

In order to improve the reliability of the fixing of the battery cells 2 and prevent the battery cells 2 from shaking, there is a first adhesive layer between the bottom of each battery cell 20 and the inner bottom of box body 11; and/or a second adhesive layer is arranged between two adjacent battery cells 20 in the battery module; and/or a third adhesive layer is arranged between the top of each battery module 20 and the restraint components 3.

As shown in FIG. 1, the battery pack of the disclosure further comprises: a spacer bar 6; the first mounting part 32A and the second mounting part 32B are located between the spacer bar 6 and the fixing beams 12; the spacer bar 6 may be of a strip structure and is provided with holes to ensure that the fasteners 5 pass through.

Still referring to FIG. 1, in order to ensure the leakproofness of the internal space of the battery pack and prevent the external liquid or water vapor from entering the battery pack and affecting the working performance of the battery cells 2, the battery pack of the disclosure may further include a sealing element 7 which is disposed between the outer cover 4 and the shell 11 and may have a strip structure or a rectangular ring structure. The sealing element 7 is provided with holes to ensure that fasteners pass through. The sealing element may be made of silicone rubber or the like. When the battery pack is used on vehicles, the sealing element is capable of absorbing the vibration transmitted to the battery pack during the operation of the vehicles.

Figure 14:
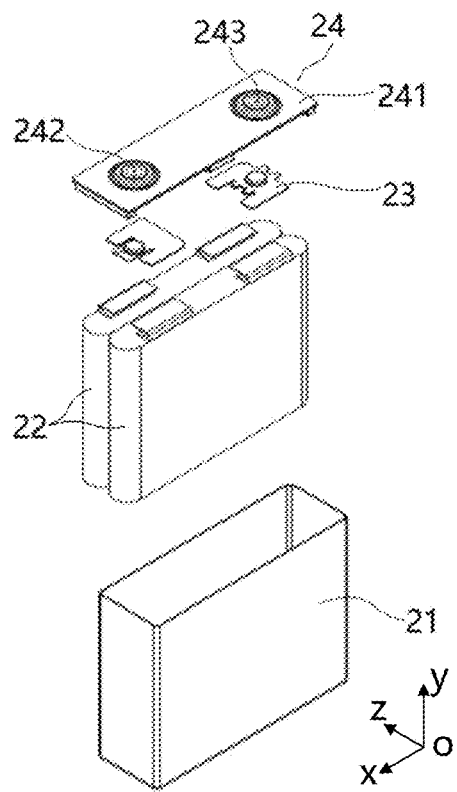
FIG. 14 is an exploded view of an embodiment of battery cells in a battery pack.

According to the exploded view shown in FIG. 14, each of the battery cells 2 includes a shell 21 and an electrode assembly 22 disposed in the shell 21 which can exist in a hexahedral shape or other shapes and has an opening. The electrode assembly 22 is housed in the shell 21. The opening of the shell 21 is covered with a cover plate assembly 24. The cover plate assembly 24 comprises a cover plate 241 and two electrode terminals arranged on the cover plate. The two electrode terminals are respectively a first electrode terminal 242 and a second electrode terminal 243. The first electrode terminal 242 may be a positive electrode terminal, and the second electrode terminal 243 may be a negative electrode terminal. In other embodiments, the first electrode terminal 242 may also be a negative electrode terminal, and the second electrode terminal 243 may be a positive electrode terminal. Switching sheets 23 are disposed between the cover plate assembly 24 and the electrode assembly 22, and the tabs of the electrode assembly 22 are electrically connected to the electrode terminals on the cover plate 241 through the switching sheets 23. In the present embodiment, there are two switching sheets 23, namely, a positive electrode switching sheet and a negative electrode switching sheet.

As shown in FIG. 14, two electrode assemblies 22 are disposed in the shell 21 and are stacked along the height direction (z direction) of the battery cells 2, where the height direction of battery cells 2 is consistent with the height direction of the battery pack. In other embodiments, of course, an electrode assembly 22 may also be provided in the shell 21, or three or more than three electrode assemblies 22 may be provided in the shell 21. A plurality of electrode assemblies 22 stack along the height (z direction) of the battery cells 2.

Figure 15:
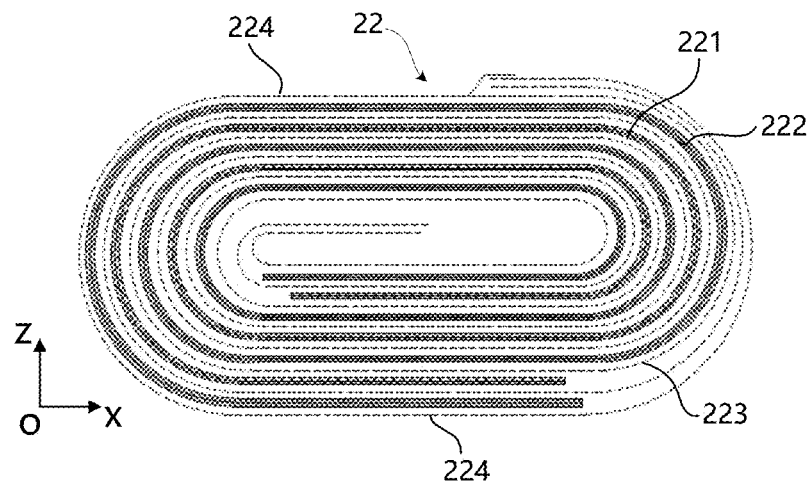
FIG. 15 is a sectional view along the xz plane when a winding electrode assembly is adopted for a battery cell.
Figure 16:
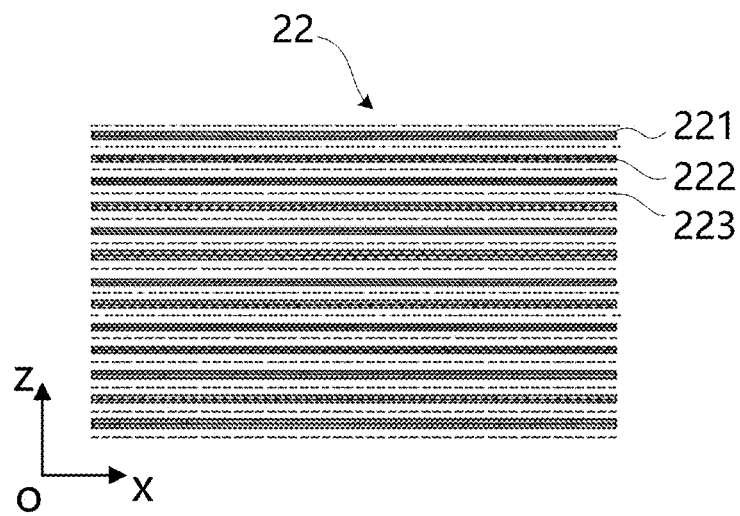
FIG. 16 is a sectional view along the xz plane when a laminated electrode assembly is adopted for a battery cell.

As shown in FIGS. 15 and 16, the electrode assembly 22 comprises a first pole piece 221, a second pole piece 222, and a diaphragm 223 disposed between the first pole piece 221 and the second pole piece 222. The first pole piece 221 may be a positive pole piece, and the second pole piece 222 is a negative pole piece. In other embodiments, the first pole piece 221 may also be a negative pole piece, while the second polar plate 222 may be a positive pole piece. The diaphragm 223 is an insulator between the first pole piece 221 and the second pole piece 222. The active material of the positive pole piece may be coated onto the coating area of the positive pole piece, and the active material of the negative pole piece may be coated onto the coating area of the negative pole piece. The part extending from the coating area of the positive pole piece acts as the positive pole tag. The part extending from the coating area of the negative pole piece acts as the negative pole tag. The positive pole tag is connected to the positive electrode terminal on cover plate assembly 24 by the positive pole switching sheet, and the negative pole tag is connected to the negative electrode terminal on the cover plate assembly 24 by the negative pole switching sheet.

As shown in FIG. 15, the electrode assembly 22 is a winding structure. The first pole piece 221, the diaphragm 223 and the second pole piece 222 are strip structures. The first pole piece 221, the diaphragm 223 and the second pole piece 222 are stacked and wound two or more turns in turn to form the electrode assembly 22, and the electrode assembly 22 is flat. When the electrode assembly 22 is being manufactured, the electrode assembly 22 can be directly wound into a flat shape, or can be wound into a hollow cylindrical structure first, and then flattened into a flat shape after winding. FIG. 15 is a schematic view showing the outline of the electrode assembly 22, in which the outer surface of the electrode assembly 22 includes two flat surfaces 224 which are opposite to each other along the height direction (z direction) of the battery cells 2. The electrode assembly 22 is roughly hexahedral, and the flat surfaces 224 are roughly parallel to the winding axis and are the outer surfaces with the largest area. The flat face 224 may be a relatively flat surface and is not necessarily a theoretical flat surface.

As shown in FIG. 16, the electrode assembly 22 is of a laminated structure, that is, the electrode assembly 22 includes a plurality of first pole pieces 221 and a plurality of second pole pieces 222, and each diaphragm 223 is arranged between each first pole piece 221 and each second pole piece 222. The first pole pieces 221 and the second pole pieces 222 are stacked along the height direction (z direction) of the battery cells 2.

In the charging and discharging process, the electrode assembly 22 will inevitably expand along the thickness direction of the pole pieces, in which case the expansion amount of each pole piece is accumulated, and the accumulated expansion amount in the height direction is larger than in other directions. The embodiments of the disclosure can restrain the expansion in the direction where maximum expansion of battery cells 2 occurs by adding fixing points between the restraint components 3 and the box body 11, so as to prevent deformation of the battery pack and improve the service life of battery pack.

Figure 13:
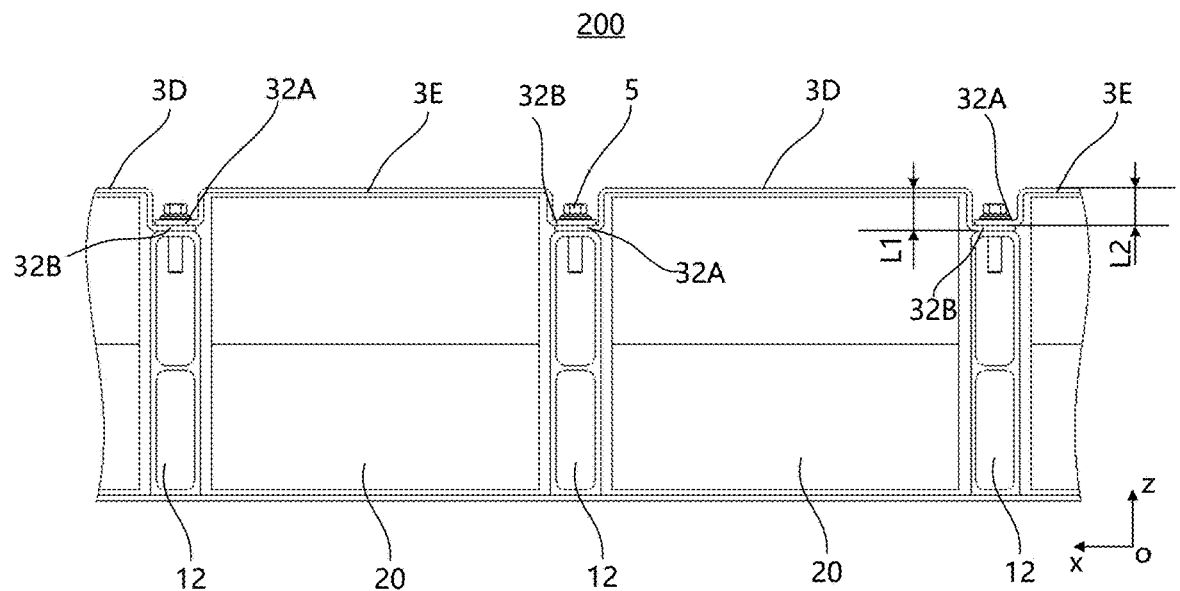
FIG. 13 is a schematic diagram of another embodiment of the battery pack of the disclosure.

FIG. 13 is a schematic structural view of another embodiment of the battery pack of the disclosure. In the battery pack 200, the limit part 31 protrudes from the first mounting part 32A and the second mounting part 32B in a direction away from the battery modules 20, and a fourth restraint component 3D and a fifth restraint component 3E constitute two adjacent restraint components.

In the fourth restraint component 3D, there is a first distance L1 between the bottom surface of the first mounting part 32A and the top surface of the limit part 31 and between the bottom surface of the second mounting part 32B and the top surface of the limit part 31. In the fifth restraint component 3D, there is a second distance L2 between the bottom surface of the first mounting part 32A and the top surface of the limit part 31 and between the bottom surface of the second mounting part 32B and the top surface of the limit part 31.

The fourth restraint component 3D and the fifth restraint component 3E are arranged alternately along the direction in which the plurality of fixing beams 12 are arranged, and the first distance L1 is greater than the second distance L2.

In some embodiments the four adjacent restraint components 3 are the fourth restraint component 3D, the fifth restraint component 3E, the fourth restraint component 3D and the fifth restraint component 3E respectively, all of which are arranged in the direction in which the plurality of fixing beams 12 are arranged. As shown in FIG. 13, from the left side, the first mounting part 32A of the first fifth restraint component 3E is located above the second mounting part 32B of the fourth restraint component 3D on the left side. The second mounting part 32B of the first fifth restraint component 3E is located above the first mounting part 32A of the fourth restraint component 3D on the right side. The first mounting part 32A of the next fifth restraint component 3E is located above the second mounting part 32B of the fourth restraint component 3D on the right, and so on.

In the height direction, the first mounting part 32A and the second mounting part 32B of each fifth restraint component 3E are overlapped on the first mounting part 32A and the second mounting part 32B of the adjacent fourth restraint component 3D on both sides.

Despite of two sizes of restraint components 3 in this embodiment, there is no requirement for the direction the fourth restraint component 3D and the fifth restraint component 3E during assembly, which can reduce assembly difficulty and improve assembly efficiency. In addition, when the battery module 20 covered by the fifth restraint component 3E fails, the battery module 20 can be replaced or repaired by simply removing the corresponding fifth restraint component 3E. When the battery module 20 covered by the fourth restraint component 3D fails, the battery module 20 can be replaced or repaired by removing the fifth restraint components 3E which are adjacent to both sides of the fourth restraint component 3D, thereby improving the convenience and efficiency of repairing the battery modules 20 in the battery pack.

The above is a detailed introduction of a battery pack provided by the disclosure. In this text, specific embodiments are taken to describe the principles and embodying methods of the disclosure, and the description of the above-mentioned embodiments is only intended to throw light upon the methods and core concepts of the disclosure. It should be pointed out that for those of ordinary skill in the art, without breaking away from the principles of the disclosure, certain improvements and modifications may be made to the disclosure, which also fall within the scope of protection of the claims of the disclosure.

What is claimed is:

1. A battery pack, comprising:
    a box body assembly, comprising a box body and a plurality of fixing beams which are fixed to the box body and divide the box body into several containing cavities;
    a plurality of battery modules, each of which comprises a plurality of battery cells and is correspondingly arranged in each containing cavity; and
    a plurality of restraint components, each of which comprises a limit part, a first mounting part and a second mounting part, wherein each limit part covers each battery module correspondingly, the first mounting part and the second mounting part are respectively connected on both sides of the limit part in the direction in which the plurality of fixing beams are arranged, and are fixed with the fixing beams on both sides of the corresponding battery module respectively;
    wherein, for two adjacent restraint components, the first mounting part of one restraint component and the second mounting part of the other restraint component are fixed on the same fixing beam and are overlapped in a height direction.

2. The battery pack of claim 1, wherein the limit part protrudes from the first mounting part and the second mounting part in a direction away from the battery modules;
    wherein there is a first distance L1 between the bottom surface of the first mounting part and the top surface of the limit part, and a second distance L2 between the bottom surface of the second mounting part and the top surface of the limit part; and
    wherein the first distance L1 is greater than the second distance L2.

3. The battery pack of claim 2, wherein the plurality of restraint components comprises three adjacent restraint components which are a first restraint component, a second restraint component and a third restraint component, and the three adjacent restraint components are arranged in sequence along the direction in which the plurality of fixing beams are arranged; and
    wherein the first mounting part of the first restraint component is below the second mounting part of the second restraint component, and the first mounting part of the second restraint component is below the second mounting part of the third restraint component.

4. The battery pack of claim 1, wherein the limit part protrudes from the first mounting part and the second mounting part in a direction away from the battery modules, and the two adjacent restraint components are a fourth restraint component and a fifth restraint component;
    wherein in the fourth restraint component, there is a first distance L1 between the bottom surface of the first mounting part and the top surface of the limit part, and between the bottom surface of the second mounting part and the top surface of the limit part;
    wherein in the fifth restraint component, there is a second distance L2 between the bottom surface of the first mounting part and the top surface of the limit part, and between the bottom surface of the second mounting part and the top surface of the limit part; and
    wherein the fourth restraint component and the fifth restraint component are arranged alternately along the direction in which the plurality of fixing beams are arranged, and the first distance L1 is greater than the second distance L2.

5. The battery pack of claim 2, wherein the thickness of the first mounting part is t and L1−L2≥t.

6. The battery pack of claim 1, further comprising a plurality of fasteners;
   wherein the first mounting part is provided with a plurality of first mounting holes spaced along the length direction of the fixing beams, and the second mounting part that is superposed on the first mounting part in the height direction is provided with a plurality of second mounting holes spaced along the length direction of the fixing beams; and
   wherein each fastener passes through the corresponding second mounting hole and the corresponding first mounting hole in turn and is fixed with the corresponding fixing beam.

7. The battery pack of claim 6, wherein the first mounting part is located below the second mounting part which is overlapped on the first mounting part in the height direction, and the diameter of the second mounting holes is smaller than the diameter of the first mounting holes.

8. The battery pack of claim 1, wherein a stiffener is provided on the limit part.

9. The battery pack of claim 1, wherein each restraint component has a split structure and covers at least part of the surface of the corresponding battery module.

10. The battery pack of claim 1, comprising an outer cover which is disposed on a side of the restraint components away from the battery modules and closes an open end of the box body.

11. The battery pack of claim 10, wherein there is a preset gap between an inner surface of the outer cover and an outer surface of the restraint components.

12. The battery pack of claim 11, wherein the preset gap is in a range of 2 mm to 100 mm.

13. The battery pack of claim 1, comprising at least one of the following:
   a first adhesive layer arranged between a bottom surface of each battery module and an inner bottom surface of the box body;
   a second adhesive layer arranged between two adjacent battery cells in the battery modules; or
   a third adhesive layer arranged between a top of each battery module and the restraint components.

* * * * *